(12) United States Patent
Van Blerkom

(10) Patent No.: US 7,528,873 B2
(45) Date of Patent: May 5, 2009

(54) VARIABLE PIXEL CLOCK ELECTRONIC SHUTTER CONTROL

(75) Inventor: Daniel Van Blerkom, Altadena, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 567 days.

(21) Appl. No.: 11/318,512

(22) Filed: Dec. 28, 2005

(65) Prior Publication Data

US 2006/0119721 A1 Jun. 8, 2006

Related U.S. Application Data

(62) Division of application No. 10/202,622, filed on Jul. 22, 2002, now Pat. No. 7,084,914.

(60) Provisional application No. 60/306,744, filed on Jul. 20, 2001.

(51) Int. Cl.
*H04N 3/14* (2006.01)
(52) U.S. Cl. .................................. 348/296; 348/302
(58) Field of Classification Search .............. 348/296, 348/294, 207.99, 302, 308
See application file for complete search history.

(56) References Cited

U.S. PATENT DOCUMENTS

| | | | |
|---|---|---|---|
| 5,471,515 A | 11/1995 | Fossum et al. | |
| 5,767,904 A | 6/1998 | Miyake | |
| 6,278,490 B1 * | 8/2001 | Fukuda et al. | .............. 348/362 |
| 6,529,242 B1 | 3/2003 | Panicacci | |
| 6,809,766 B1 | 10/2004 | Krymski et al. | |
| 6,847,398 B1 | 1/2005 | Fossum | |
| 2002/0080263 A1 | 6/2002 | Krymski | |
| 2002/0113886 A1 | 8/2002 | Hynecek | |
| 2002/0175954 A1 | 11/2002 | Pearson | |
| 2005/0057674 A1 | 3/2005 | Krymski et al. | |

\* cited by examiner

*Primary Examiner*—Ngoc-Yen T Vu
*Assistant Examiner*—Nicholas G Giles
(74) *Attorney, Agent, or Firm*—Dickstein Shapiro LLP

(57) ABSTRACT

CMOS image sensor with a rolling shutter that uses two separate clocks. One of the clocks is used during normal operation. When timing is changed, the other clock is started and used during an interim period to avoid distortion in the image. After that interim period, the new clock timing is coupled to the original clock circuit.

5 Claims, 2 Drawing Sheets

VARIABLE PIXEL CLOCK ELECTRONIC SHUTTER CONTROL

CROSS-REFERENCE TO RELATED APPLICATIONS

This application is a divisional of U.S. patent application Ser. No. 10/202,622, filed Jul. 22, 2002 now U.S. Pat. No. 7,084,914, which claims benefit of U.S. Provisional Application No. 60/306,744, filed on Jul. 20, 2001, which are hereby incorporated by reference in their entireties.

BACKGROUND

CMOS image sensors are described in U.S. Pat. No. 5,471,515. Almost all commercial CMOS imagers rely on a rolling shutter to establish the integration time for the captured image. This contrasts with typical CCD systems, in which a full frame shutter is used to capture the image. A rolling shutter establishes staggered integration times for respective rows of the image. Each row has the same integration time, but each row starts integration and ends its integration at different staggered time. Hence, the time of the row integration, or "shutter" is rolling.

FIG. 1 shows a block diagram of a typical CMOS image sensor of this type. The sensor includes an array 150 of photoreceptors which are arranged into rows such as 1, 2 and 3. Each of the photoreceptors include in-pixel switches such as 152 which are controlled by a control circuitry 160. The control circuitry provides control signals to the various pixels. For example, an entire row of pixels such as row 1 may be controlled all at the same time such that the entire row begins integrating and the same time, and ends integrating and is read out also at the same time.

FIG. 2A shows a diagram of the operation of such a rolling shutter. The x axis in FIG. 2a represents time, while the y axis represents different rows. It can be seen that row 1 starts at time 100 and ends at time 102. Similarly, integration within row 2 starts at time 104 which is some time interval t after time 100. Integration of row 2 ends at 106 which is after 102. The integration time for each of these rows is the same, even though the start and time for each of these rows may be different.

In order to do this, the CMOS sensor logic 160 establishes two row pointers called the readout pointer and the shutter pointer. The start of each row readout time is established by the shutter pointer. This causes the specified row to be reset, and then to begin integration. The readout pointer is used to determine which row of pixels will be sampled and output. FIG. 2a shows the shutter pointers as the leftmost dots such as 100, and the readout pointers as the rightmost dots such as 102. For example, the dots that start and end the eighth vertical dotted lines, labeled as 8 in FIG. 1 occur at the same time that row 3 is being read out.

Various conditions may make it desirable to slow the output frame rate of the CMOS image sensor. This may be caused by limits in bandwidth, limits in the ability to compress the video, or low light conditions requiring longer integration times. For example, this scene may change to become more or less complicated and thus take more or less time to compress. Alternatively, battery conditions may necessitate a situation where power needs to be conserved. This may make it desirable to change the system clock.

There are known ways of slowing the output using this rolling shutter.

A first way is to maintain the output data rate, but to add a vertical blanking time to the output data stream. This produces a burst of data at the time of the active rows. During the vertical blanking period, there is a long absence of data, however. In many systems, this may be difficult because the burst data rate will need to be buffered to match the slower data rate at a later point in the system.

A more direct technique of slowing the output data rate is to slow the master clock frequency of the CMOS image sensor to thereby slow the output data rate and the frame rate. This effectively outputs the data at that slower rate. However, this can corrupt the output image frames during the time while the clock change is occurring. The corruption of data occurs because the sensor logic is operating on both the current frame and the next frame simultaneously. Therefore, there is no single instant when a master clock change will not result in either the current frame or the next frame having rows with different integration times. The system therefore compensates, but doing so may require dropping corrupted frames. This can effect the video output during those corrupted frames.

Another method is to request the image sensor to change its output data rate. This has similar problems to those described above.

SUMMARY

The present application teaches a system that allows data output rate changes with compensation for the data rate change.

BRIEF DESCRIPTION OF THE DRAWINGS

These and other aspects will now be described in detail with reference to the accompanying drawings, wherein.

DETAILED DESCRIPTION

Figure 1:
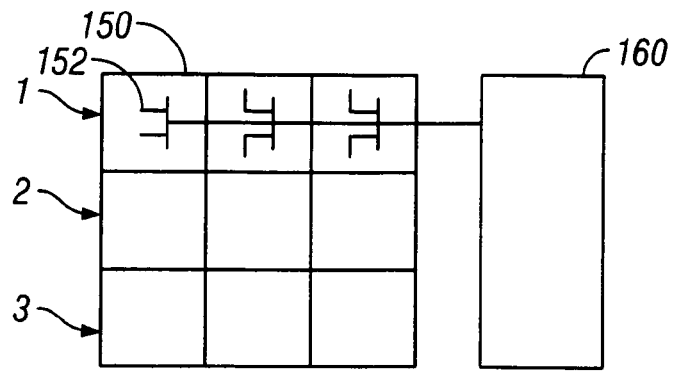
FIG. 1 shows a block diagram of a CMOS image sensor.
Figure 2A:
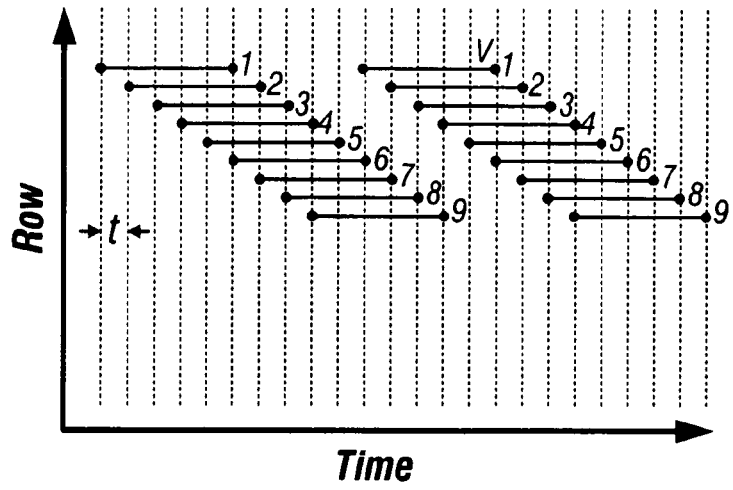
FIGS. 2a and 2b show depictions of rolling shutters that two different timing intervals.
Figure 2B:
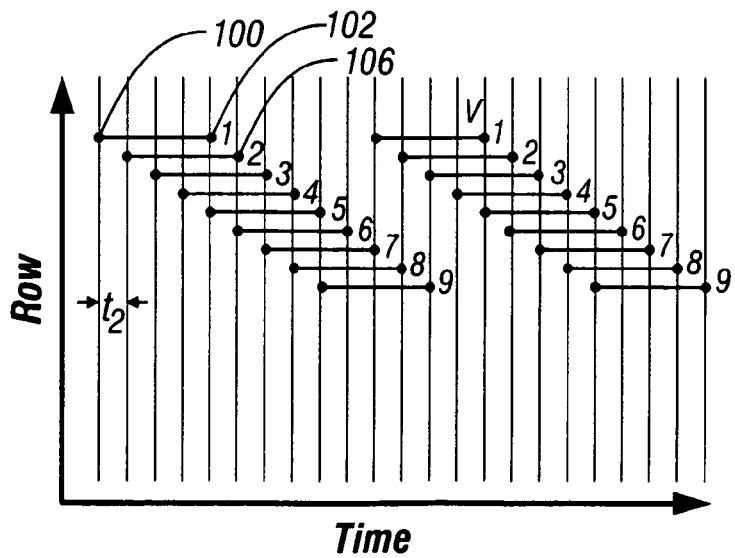

FIG. 2B shows an example situation of a rolling shutter that is slower than the shutter in FIG. 2A. The techniques disclosed herein enable switching between these two different clock techniques. In FIG. 2B, the pixel clock, and thus the row time and frame rate, is slower than that in FIG. 2A by a ratio of 5:4. However, each row is integrated for the same amount of time in FIGS. 2A and 2B. Therefore, the interval "t2" in FIG. 2B is different than the interval "t" in FIG. 2A.

A camera system might have a goal of switching between the settings in FIG. 2a and the settings in FIG. 2b, in order to match the sensor output data bandwidth to the system bandwidth while maintaining the same exposure settings.

Figure 3:
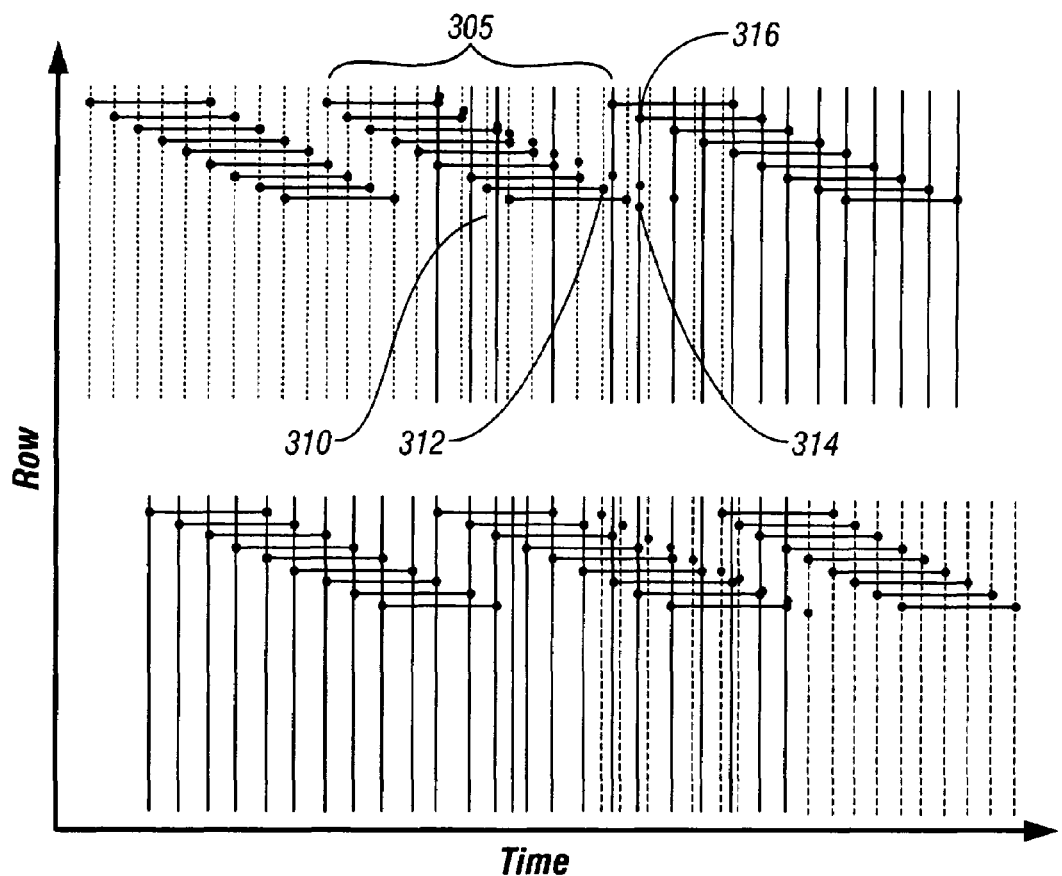
FIG. 3 shows a switching system between the FIGS. 2a and 2b systems.
Figure 4:
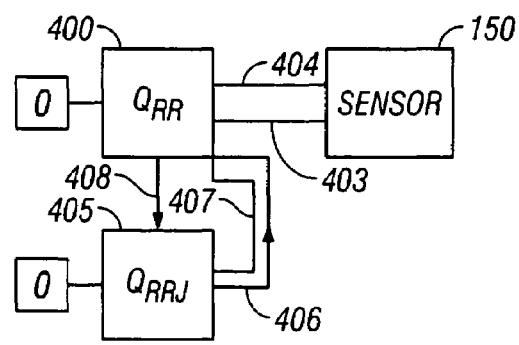
FIG. 4 shows a block diagram of the special clocks.

FIG. 3 shows a timing diagram of the technique that is used according to the present system to seamlessly switch between the settings in FIGS. 2a and 2b. This is done without causing corruption of the image stream. FIG. 3 shows there is a period of overlap during which both the old and new pixel clocks are used to set the timing. FIG. 4 shows the two modules; the row read module 400 and row read jump module 405, which are used to create the corruption-free switching between the pixel clocks. These two modules operate with individually controllable pixel clock speeds.

The row read module 400 controls the row read and reset functions for the current pixel clock speed of the image. The row read jumping block, in contrast, controls the row reset for a new pixel clock speed. When no pixel clock speed change is required, the row read jumping block is disabled. However, the two modules can operate at different pixel clock speeds simultaneously, since each block includes its own pixel clock generation circuit. The row read jumping block 405 is effectively a replica of the row read block 400, with its row read functionality removed.

In order to enable the row read jumping block, the readout pointer is set at the top of its current frame plus an offset, as described below the enable line 408 is activated at this time. In operation, a setting change has been requested. The jump shutter pointer 406, which is the dual of the shutter pointer 404 in the row read block, begins to output resets for rows when it has wrapped to the next frame. When the shutter pointer 404 reaches the end of the current frame, it is disabled. Thereafter, when the readout pointer 403 reaches the start of the new frame, the row read jumping module 405 is disabled, and the row read block 400 is updated with the new settings 406, 407. Thus, both clocks 403, 404, 406, 407 operate simultaneously, for the time of a single frame. Effectively, the new clock is used during the transition time. 305 is used to set the time for the next integration. For example, for line 310 shown in FIG. 3, during a normal clock, the next integration would start at the time 312. During the interim integration, however, the second clock produces new ending times different than starting time 314. Hence, the next integration 316 starts at the same time as the ending clock 314.

When switching from a slower pixel clock frequency to a faster pixel clock frequency, an offset must be added to the start of the new pixel clock frame to avoid wrapping the new frame on top of the old frame and thus corrupting the old frame. This offset is labeled as D, and can be determined as $$D = W \frac{P_{old} - P_{new}}{P_{old}}$$

where W is the number of rows in the frame including vertical blanking rows, $P_{old}$ is the current pixel clock speed, and $P_{new}$ is the new faster pixel clocks the given both in terms of master clock cycles. This operation can be implemented in code as shown in the code segment below. This can be done using this code segment without a division operation.

```
-- DVB 3/31/00: This process calculates approximately how many lines to delay
-- before starting the jump integration module. When the readcount
-- is equal to the value of comparecnt, the jump module is started.
-- The actual equation should be
--         CompareCnt = AllWidth*(pclk - pclk_jump)/pclk
-- where pclk is the # of clocks per pixclk
-- The approximation implemented here is
--         CompareCnt = AllWidth / 2^(log2(pclk) - log2(pclk-pclk_jump))
-- where log2 is really INT(log( ))
process(pixclk_speed_local, pixclk_speed_jump_local)
begin
    var_pc <= To_StdLogicVector(pixclk_speed_local)+"0010";
    var_pc_d <= To_StdLogicVector(pixclk_speed_local) -
To_StdLogicVector(pixclk_speed_jump_local);
end process;
process(var_pc, var_pc_d, var_log_pc, var_log_pc_d)
begin
    if (s12i(var_pc) >= 16) then
        var_log_pc <= 4;
    elsif (s12i(var_pc) >= 8) then
        var_log_pc <= 3;
    elsif (s12i(var_pc) >= 4) then
        var_log_pc <= 2;
    else
        var_log_pc <= 1;
    end if;
    if (s12i(var_pc_d) >= 16) then
        var_log_pc_d <= 4;
    elsif (s12i(var_pc_d) >= 8) then
        var_log_pc_d <= 3;
    elsif (s12i(var_pc_d) >= 4) then
        var_log_pc_d <= 2;
    elsif (s12i(var_pc_d) >= 2) then
        var_log_pc_d <= 1;
    else
        var_log_pc_d <= 0;
    end if;
    var_sr <= var_log_pc - var_log_pc_d;
end process;
process(AllWidth_out)
begin
    AW(0) <= To_BitVector(To_StdLogicVector(AllWidth_out)-2);
    AW(1) <= '0' &AllWidth_out(10 downto 1);
    AW(2) <= "00" &AllWidth_out(10 downto 2);
    AW(3) <= "000" &AllWidth_out(10 downto 3);
    AW(4) <= "0000" &AllWidth_out(10 downto 4);
end process;
process (AW, var_sr, pixclk_speed_jump_local, pixclk_speed_local)
begin
    if ieee.std_logic_unsigned.">="(To_StdLogicVector(pixclk_speed_jump_local),
                       To_StdLogicVector(pixclk_speed_local)) then
        CompareCnt <= "00000000000";
    else
```

```
        CompareCnt <= AW(var_sr);
    end if;
end process;
```

Since the row read and row read jumping modules can operate asynchronously, they could potentially overlap reset functions which could also result in image corruption. To avoid this, the row read and row read jumping modules include a handshaking mechanism. This avoids the modules simultaneously issuing reset requests to the pixel array row driver logic.

This technique also works for the simpler situation of exposure changes with no pixel clock change. In this case, both the row read and row read jumping module operate with the same pixel clock.

In the above, many of the functionalities can be carried out in either hardware or software. For example, a processor may be used to carry out the functions of the two clock generating elements, programmed according to the techniques disclosed above.

Other embodiments are also within the disclosed invention. All such modifications are intended to be encompassed within the following claims, in which:

What is claimed is:

1. An image sensor, comprising:
   an array of image sensing elements; and
   a controller for said array of image sensing elements, which produces clock signals to control said array of image sensing elements and which produces first clock signals to control a time of integration beginning and second clock signals at a second time to control a time of integration ending, said controller controlling said first clock signals to be produced at a same time as said second time for a different row during normal operation, and enabling control of a clock-changing operation to set said first clock signal to be produced at a time different than said second time,
   wherein said controller includes first and second clock producing elements, said first clock producing element normally producing said first and second clock signals, and said second clock producing element producing an additional clock signal used as said different time.

2. A sensor as in claim 1, wherein said additional clock signal is formed according to specified formation characteristics, and said formation characteristics of said additional clock signal are used to drive said first clock producing elements during a clock period after an interim clock period.

3. A sensor as in claim 1, wherein said array of image sensing elements and said controller are formed of CMOS semiconductors.

4. A sensor as in claim 1, wherein said controller includes a processor which is programmed to produce said first and second clock signals.

5. A sensor as in claim 1, wherein said first clock signals and second clock signals operate at different clock speeds.

* * * * *